(12) United States Patent
Balakrishnan et al.

(10) Patent No.: US 9,619,243 B2
(45) Date of Patent: Apr. 11, 2017

(54) SYNCHRONOUS BMC CONFIGURATION AND OPERATION WITHIN CLUSTER OF BMC

(71) Applicant: AMERICAN MEGATRENDS, INC., Norcross, GA (US)

(72) Inventors: Venkatesan Balakrishnan, Chennai (IN); Chandrasekar Rathinwswaran, Coimbatore (IN); Manish Tomar, Duluth, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 505 days.

(21) Appl. No.: 14/134,720

(22) Filed: Dec. 19, 2013

(65) Prior Publication Data

US 2015/0178095 A1  Jun. 25, 2015

(51) Int. Cl.
*G06F 13/362* (2006.01)
*G06F 9/445* (2006.01)
*G06F 9/44* (2006.01)
*G06F 13/364* (2006.01)

(52) U.S. Cl.
CPC .......... *G06F 9/4411* (2013.01); *G06F 13/364* (2013.01)

(58) Field of Classification Search
None
See application file for complete search history.

(56) References Cited

U.S. PATENT DOCUMENTS

| | | | | |
|---|---|---|---|---|
| 2012/0023210 A1* | 1/2012 | Lai | ............................ | G06F 9/46 709/223 |
| 2012/0271927 A1* | 10/2012 | Shakirzyanov | ........ | G06F 9/5061 709/220 |
| 2014/0229758 A1* | 8/2014 | Richardson | ......... | G06F 11/2007 714/4.11 |
| 2014/0344389 A1* | 11/2014 | Hsieh | .................... | G06F 13/362 709/208 |

* cited by examiner

*Primary Examiner* — Ilwoo Park
(74) *Attorney, Agent, or Firm* — Locke Lord LLP; Tim Tingkang Xia, Esq.

(57) ABSTRACT

The present disclosure relates to a synchronous BMC configuration system for automatically configuring BMCs installed on clusters of managed devices. The synchronous BMC configuration system includes: (a) a master BMC configuration system; and (b) a plurality of clusters of managed devices. Each cluster of managed devices includes a master managed device, and one or more slave managed devices. The master managed device and the slave managed devices of each cluster are substantially same type of managed devices and have substantially same configuration. The BMC configuration information is received by the master BMC configuration system, and stored in a database of the master BMC configuration system. The master BMC configuration system configures all BMCs of master managed devices, and slave BMC configuration system on each master managed device of cluster configures all BMCs of slave managed devices of the cluster.

28 Claims, 5 Drawing Sheets

SYNCHRONOUS BMC CONFIGURATION AND OPERATION WITHIN CLUSTER OF BMC

FIELD

The present disclosure generally relates to baseboard management controller (BMC) configuration, and more particularly to synchronous BMC configuration and operation within cluster of BMC.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A baseboard management controller (BMC) is a specialized service processor. This service processor monitors the physical state of a computer, network server or other hardware device using sensors and communicating with the system administrator through an independent connection. The BMC is part of the Intelligent Platform Management Interface (IPMI) and is usually contained in the motherboard, baseboard, or main circuit board of the device to be monitored. Depending on the complexity of the motherboard, baseboard, or main circuit board of the device, the sensors installed on these boards can vary from very little to very large number. These sensors measure internal physical variables such as temperature, humidity, power-supply voltage, fan speeds, resource such as storage space usage, and memory usage, communications parameters and operating system (OS) functions. If any of these variables happens to stray outside predetermined ranges or limits, the administrator is notified. That person can then take corrective action by remote control through an independent communication channel. The monitored device can be power cycled or rebooted as necessary. In this way, a single administrator can remotely manage numerous servers and other devices simultaneously, saving on the overall operating cost of the network and helping to ensure its reliability.

Prior to the management of these BMC as well as the sensors on the BMC, the BMC management system must be configured. For example, the BMC management system must know the number of servers with BMC that are communicatively connected to the BMC management system and the number of sensors and sensor aggregators that are communicatively connected to each of the BMC. The BMC configuration can be very tedious and time consuming. Traditionally, the system administrator has to go through all BMC installed on each of the computer server or storage devices to complete the BMC configurations.

In certain data center, there are numerous similar or identical computer servers or storage devices mounted on one or more chasses. These computer servers, or storage devices may have same configurations and same number of sensors for monitoring the performance of the computer servers or storage devices. These computer servers or storage devices can be grouped into a number of clusters, each cluster having a number of same computer servers, or storage devices such that they have identical BMC configuration. For these computer servers or storage devices cluster, a simpler way to configure these same BMC can be devised to take advantage of such configuration and avoid repetitive tedious BMC configurations that are prone to human errors.

Therefore, heretofore unaddressed needs still exist in the art to address the aforementioned deficiencies and inadequacies.

SUMMARY

Certain embodiments of the present disclosure direct to a synchronous BMC configuration system for automatically configuring a plurality of baseboard management controllers (BMCs) installed on a plurality of clusters of managed devices. In certain embodiments, the synchronous BMC configuration system includes: a master BMC configuration system, and a plurality of clusters of managed devices. Each cluster of the plurality of clusters of managed devices comprises a master managed device, and a plurality of slave managed devices, the master managed device and the plurality of slave managed devices are substantially same type of managed devices and have substantially same configuration, each master managed device and the plurality of slave managed devices has a BMC installed for system management, and each cluster of managed devices has one set of BMC configuration information.

In certain embodiments, the master BMC configuration system includes: a plurality of input interfaces configured to communicate with a BMC configuration device over a network and allow a user to provide one set of BMC configuration information to each of the plurality of clusters of managed devices; a master BMC configuration database configured to store the set of BMC configuration information for each of the plurality of clusters of managed devices received from the plurality of input interfaces; a plurality of output interfaces configured to communicate with each master managed device of each cluster of managed devices; and a master BMC configuration module constructed to configure the BMCs installed on each master managed device of each cluster through the plurality of output interfaces.

In certain embodiments, the plurality of input interfaces of the master BMC configuration system includes at least one of: a user interface module for a local user to input BMC configuration information and configure the BMCs installed on the plurality of clusters of managed devices; a network interface controller to allow the user to communicate with the master BMC configuration module over a network; and a web interface module for a remote user to configure the BMCs installed on the plurality of clusters of managed devices through the network interface controller over the network.

In certain embodiments, the plurality of output interfaces of the master BMC configuration system includes at least one of: a management network controller configured to provide a "side band" access to the BMCs of a plurality of master managed devices of the plurality of clusters through a management system bus, wherein the management system bus comprises at least one of an SMBus, and a PCI management Bus; a RS-232 interface configured to allow user to access the BMCs of the plurality of master managed devices of the plurality of clusters through a local or remote access through a serial connection, a Modem connection, or a serial on LAN connection such that the user can use a command line interface that enables the BMC configuration device to communicate over the RS-232 connection with the BMCs of the plurality of master managed devices of the plurality of clusters; an IPMB interface configured to allow the user to access other BMCs of the plurality of master managed devices of the plurality of clusters through at least one of the IPMB and Inter-Integrated Circuit (I²C) bus; and a system interface configured to allow the master BMC configuration module to access system bus of the BMCs of the plurality of master managed devices of the plurality of clusters through at least one of the I2C bus and system management bus (SMBus), wherein the IPMB, the I2C bus, and the SMBus are also used to access the sensors, control circuits, non-volatile storage space of the BMCs of the plurality of master managed devices of the plurality of clusters having at least one of a sensor data record (SDR), a system event log (SEL), and a field replaceable unit (FRU).

In certain embodiments, the BMC configuration information includes: the type of the managed devices of the cluster; a name of the manufacturer; a model number; a management information base (MIB) file of the managed devices of the cluster; a number of slave managed devices in the cluster; an internet protocol (IP) addresses of the master manage device and the slave managed devices of the cluster; and a globally unique identification number of the master managed device and the slave managed devices of the cluster.

In certain embodiments, the BMC configuration information is entered manually through the user interface module, or automatically imported from a pre-edited file, wherein the pre-edited files comprises the BMC configuration information exported from a cluster that contains substantially same type of managed device and substantially same configuration as the plurality of managed devices with the cluster.

In certain embodiments, the pre-edited file comprises at least one of a text file, an excel file, and an XML file.

In certain embodiments, the master BMC configuration module is configured to receive BMC Configuration information from at least one of the input interfaces of the master BMC configuration system, allow the user to modify the received BMC configuration information. store the BMC configuration information in the master BMC configuration database of the master BMC configuration system, discover the master managed devices in each of the plurality of clusters of managed devices through the discovery module of the master BMC configuration module according to the number and the associated IP addresses of the clusters of managed devices, configure the BMC of the master managed device of each cluster of managed devices according to the BMC configuration information for the cluster using the mater BMC configuration module of the master BMC configuration system, transmit the slave BMC configuration information for the cluster to the master managed device of each cluster through the plurality of output interfaces of the master BMC configuration system, install a slave BMC configuration system on the master managed device of each cluster of managed devices, and instruct each slave BMC configuration system on the master managed device of each cluster of managed devices to configure the BMCs on all slave managed devices of the cluster of managed devices according to the BMC configuration information for the cluster.

In certain embodiments, each master managed device includes a slave BMC configuration system, and the slave BMC configuration system includes: a plurality of input interfaces of the slave BMC configuration system configured to communicate with the master BMC configuration system of each master manage device of the cluster over a network and receive BMC configuration information for the slave managed devices of the cluster; a slave BMC configuration database configured to store the set of BMC configuration information for each slave managed device of the cluster received from the at least one of the plurality of output interfaces of the master BMC configuration system; a plurality of output interfaces of the slave BMC configuration system configured to communicate with the each salve managed device of the cluster; and a slave BMC configuration module constructed to configure the BMCs installed on each slave managed device of the cluster through the plurality of output interfaces of the slave BMC configuration system.

In certain embodiments, the plurality of input interfaces of the slave BMC configuration system includes at least one of: a user interface module for a local user to input BMC configuration information and configure the BMCs on the slave managed devices of the cluster; a network interface controller of the master managed device to allow the user to communicate with a slave BMC configuration module over a network; and a web interface module of the slave BMC configuration system configured for a remote user to configure the BMCs on the slave managed devices of the cluster through the network interface controller of the slave BMC configuration system over the network.

In certain embodiments, the plurality of output interfaces of the slave BMC configuration system includes at least one of: a management network controller configured to provide a "side band" access to the BMCs of the slave managed devices of the cluster through a management system bus, wherein the management system bus comprises at least one of an SMBus, and a PCI management Bus; a RS-232 interface configured to allow user to access BMC BMCs of the slave managed devices of the cluster through a local or remote access through a serial connection, a Modem connection, or a serial on LAN connection such that the user can use a command line interface that enables the master BMC configuration system to communicate over the RS-232 connection with the BMCs of the slave managed devices of the cluster; an IPMB interface configured to allow the user to access other remote BMCs of the slave managed devices of the cluster through at least one of the IPMB and Inter-Integrated Circuit (I2C) bus; and a system interface configured to allow the slave BMC configuration module to access system bus of the slave managed devices of the cluster through at least one of an I2C bus and a system management bus (SMBus), wherein the IPMB, the I2C bus, and the SMBus are also used to access the sensors, control circuits, non-volatile storage space of slave managed devices in the cluster, and each non-volatile storage space of slave managed devices of the cluster has at least one of a sensor data record (SDR), a system event log (SEL), and a field replaceable unit (FRU).

In certain embodiments, the slave BMC configuration module is configured to receive BMC Configuration information from at least one of the input interfaces of the slave BMC configuration system, allow the user to modify the received BMC configuration information, store the BMC configuration information in the slave BMC configuration database of the slave BMC configuration system, discover all slave managed devices of the cluster through the discovery module of the slave BMC configuration module according to the number and the associated IP addresses of the slave managed devices of the cluster, receive instructions from the master BMC configuration system to configure all BMCs of the slave managed devices of the cluster, and configure the BMCs of the slave managed devices of the cluster according to the BMC configuration information for the cluster using the slave BMC configuration module of the slave BMC configuration system.

Certain aspects of the present disclosure direct to a method for automatically configuring a plurality of BMCs installed on a plurality of clusters of managed devices by a synchronous BMC configuration system, including: providing a synchronous BMC configuration system having a master BMC configuration system and a plurality of clusters of managed devices, wherein each of the plurality of clusters of managed devices has a master managed device, and a plurality of slave managed devices; entering BMC configuration information by a user using a user interface module of the master BMC configuration system, or importing a set of pre-edited files exported from another BMC configuration system that has similar managed devices and configuration, wherein the BMC configuration information comprises: number of clusters of managed devices; and BMC configuration information of each of the plurality of clusters of managed devices; storing the BMC configuration information of the BMCs of the master managed devices of the plurality of clusters of managed devices in a master BMC configuration database of the master BMC configuration system; discovering one master managed device in each of the plurality of clusters of managed devices through a discovery module of the master BMC configuration system according to the number and the associated IP addresses of the clusters of managed devices; configuring the BMCs of all master managed device of the plurality of clusters according to the BMC configuration information for each cluster using the mater BMC configuration module of the master BMC configuration system; transmitting the BMC configuration information for the cluster to the master managed device of each cluster through the at least one of the plurality of output interfaces of the master BMC configuration system; installing one slave BMC configuration system on the each master managed device of each cluster of managed devices; and instructing the slave BMC configuration system on each master managed device of each cluster of the managed devices to configure BMCs on the master managed devices of each cluster of managed devices according to the BMC configuration information for the cluster.

In certain embodiments, the method further includes: allowing the user to modify the received BMC configuration information.

In certain embodiments, the master managed device in a cluster and the plurality of slave managed devices in the same cluster are substantially same type of managed devices and have substantially same configuration, each of the master managed device and the plurality of slave managed devices of the cluster has a BMC installed for system management, and each cluster of managed devices has one set of BMC configuration information for the cluster.

In certain embodiments, the master BMC configuration system includes: a plurality of input interfaces configured to communicate with a BMC configuration device over a network and allow a user to provide BMC configuration information and BMC configuration information for the BMCs of each of the plurality of clusters of managed devices; a master BMC configuration database configured to store the BMC configuration information and BMC configuration information of each of the plurality of clusters of managed devices received from the plurality of input interfaces; a plurality of output interfaces configured to communicate with each master managed devices of the plurality of clusters of managed devices; and a master BMC configuration module constructed to configure the BMCs on each of the master managed device of the plurality of clusters of managed devices through the plurality of output interfaces.

In certain embodiments, the BMC configuration information for each cluster of managed devices includes: the type of the managed devices of the cluster; a name of the manufacturer; a model number; a management information base (MIB) file of the managed devices of the cluster; a number of slave managed devices in the cluster; an internet protocol (IP) addresses of the master manage device and the slave managed devices of the cluster; and a globally unique identification number of the master managed device and the slave managed devices of the cluster.

In certain embodiments, the BMC configuration information of each cluster of managed devices is entered manually through the user interface module, or automatically imported from a pre-edited file, wherein the pre-edited files comprises the BMC configuration information exported from a cluster that contains substantially same type of managed devices and substantially same configuration as the plurality of managed devices with the cluster.

In certain embodiments, the pre-edited file comprises at least one of a text file, an excel file, and an XML file.

In certain embodiments, the master BMC configuration module is configured to receive the BMC configuration information from at least one of the input interfaces of the master BMC configuration system, allow the user to modify the received BMC configuration information, store the BMC configuration information in the master BMC configuration database of the master BMC configuration system, discover the master managed devices in each of the plurality of clusters of managed devices through the discovery module of the master BMC configuration module according to the number and the associated IP addresses of the clusters of managed devices, configure the BMC of the master managed device of each cluster according to the BMC configuration information of the cluster using the mater BMC configuration module of the master BMC configuration system, transmit the slave BMC configuration information for the cluster to the master managed device of each cluster through the plurality of output interfaces of the master BMC configuration system, install one slave BMC configuration system on the each master managed device of each cluster of managed devices, and instruct each slave BMC configuration module of the slave BMC configuration system on the master managed device of each cluster of managed devices to configure the BMCs on all slave managed devices of the cluster according to the BMC configuration information for the cluster.

In certain embodiments, each master managed device includes a slave BMC configuration system, wherein the slave BMC configuration system includes: a plurality of input interfaces of the slave BMC configuration system configured to communicate with the master BMC configuration system of each master manage device of the cluster over a network and receive BMC configuration information for the slave managed devices of the cluster; a slave BMC configuration database configured to store the set of BMC configuration information for each slave managed device of the cluster received from the at least one of the plurality of output interfaces of the master BMC configuration system; a plurality of output interfaces of the slave BMC configuration system configured to communicate with the each salve managed device of the cluster; and a slave BMC configuration module constructed to configure the BMCs installed on each slave managed device of the cluster through the plurality of output interfaces of the slave BMC configuration system.

In certain embodiments, the slave BMC configuration module is configured to receive the BMC configuration information from at least one of the input interfaces of the slave BMC configuration system, allow the user to modify the received BMC configuration information, store the BMC configuration information in the slave BMC configuration database of the slave BMC configuration system, discover all slave managed devices of the cluster through the discovery module of the slave BMC configuration module according to the number and the associated IP addresses of the slave managed devices of the cluster, receive instructions from the master BMC configuration system to configure all BMCs of the slave managed devices of the cluster, and configure the BMCs of the slave managed devices of the cluster according to the BMC configuration information for the cluster using the slave BMC configuration module of the slave BMC configuration system.

Certain aspects of the present disclosure direct to a non-transitory computer storage medium having computer-executable instructions stored thereon which, when executed by a processor of a BMC configuration system, cause the processor to provide a plurality of input interfaces for receiving BMC configuration information from a user, and import a set of pre-edited files exported from another BMC configuration system that has similar managed devices and configuration, modify the received BMC configuration information by the user, store the BMC configuration information in a BMC configuration database, discover at least one managed device of the BMC configuration system through a discovery module according to a number and associated IP addresses of the at least one managed devices, and configure each BMC of the at least one managed devices according to the BMC configuration information using a BMC configuration module.

In certain embodiments, the BMC configuration system is a synchronous BMC configuration system having a master BMC configuration system and a plurality of clusters of managed devices, and each of the plurality of clusters of managed devices has a master managed device, and a plurality of slave managed devices. In certain embodiments, the BMC configuration information comprises: a number of clusters of managed devices; and BMC configuration information of each of the plurality of clusters of managed devices. In certain embodiments, the BMC configuration database is a master BMC configuration database of the master BMC configuration system, and the BMC configuration module is a master BMC configuration module of the master BMC configuration system.

In certain embodiments, the instructions, when executed by the processor, further cause the processor to transmit the BMC configuration information for each cluster to the master managed device of the cluster through at least one of the plurality of output interfaces of the master BMC configuration system, install a slave BMC configuration system on each master managed device of the clusters of managed devices, and instruct each slave BMC configuration system on the master managed device of each cluster of managed devices to configure the BMCs on all of the slave managed devices of the cluster according to the BMC configuration information for the cluster.

In certain embodiments, the BMC configuration information for the synchronous BMC configuration system includes: the number of clusters of managed devices, and the BMC configuration information of each of the plurality of clusters of managed devices. In certain embodiments, the BMC configuration of each of the plurality of clusters of managed devices includes: type of the managed devices of the cluster; a name of the manufacturer; a model number; a management information base (MIB) file of the managed devices of the cluster; the number of slave managed devices in the cluster; the IP addresses of the master manage device and the slave managed devices of the cluster; and a globally unique identification number of the master managed device and the slave managed devices of the cluster.

In certain embodiments, the BMC configuration system is a slave BMC configuration system of a cluster of managed devices having a master managed device and a plurality of slave managed devices. In certain embodiments, the BMC configuration database is a slave BMC configuration database of a slave BMC configuration system, and the BMC configuration module is a slave BMC configuration module of a master BMC configuration system.

In certain embodiments, the BMC configuration information for the cluster comprises: type of the managed devices of the cluster; a name of the manufacturer; a model number; a management information base (MIB) file of the managed devices of the cluster; the number of slave managed devices in the cluster; the IP addresses of the master manage device and the slave managed devices of the cluster; and a globally unique identification number of the master managed device and the slave managed devices of the cluster.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION

Figure 1:
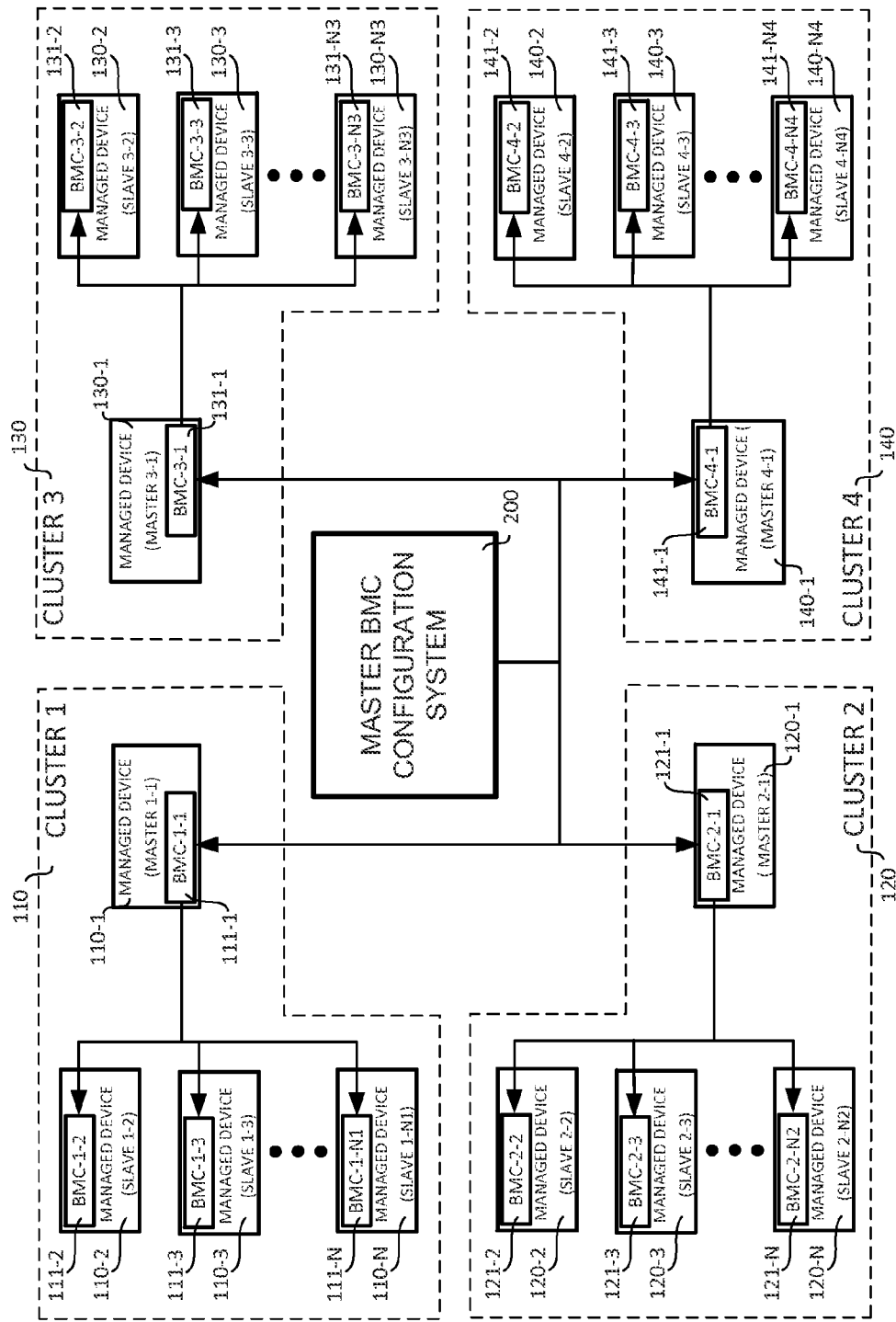
FIG. 1 schematically shows a block diagram of a synchronous BMC configuration system for configuring BMC installed on managed devices in cluster of BMC having same BMC installed on same computer servers and storage devices according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in"

includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-4, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In computer server centers or data centers, a large amount of computers, servers, routers, disk arrays, and switches are mounted on one or more racks and powered by power distribution units (PDUs). Monitoring and managing the operations of these devices (managed devices) on the racks are critically important. The managed devices on the racks can be any type of device, including, but not limited to, routers, access servers, switches, bridges, hubs, IP telephones, IP video cameras, computer hosts, and printers. Most computer servers, storage and network devices provide remote access. Common methods are accessible through SNMP and include a RS-232 serial connection (for local management) using a command-line interface (CLI) or a LAN network-controller (for remote management) using a web page. This allows an administrator to monitor and manage the managed devices on the rack from a remote terminal and interface with it to turn outlets or devices on or off, to schedule power shutdowns, to control load, etc. This can be helpful if a remote machine has gone into an unresponsive state and will not restart through normal means. The administrator can connect to the PDU where the computer servers, storage and network devices are plugged into to power-cycle these managed devices on the rack.

Referring now to FIG. 1, a block diagram of a synchronous BMC configuration system 100 is schematically shown for configuring clustered BMCs according to one embodiment of the present disclosure. In one embodiment, the synchronous BMC configuration system 100 is set up to configure 4 clusters of BMCs: cluster 1 (110), cluster 2 (120), cluster 3 (130), and cluster 4 (140). Each of the cluster 1 (110), cluster 2 (120), cluster 3 (130), and cluster 4 (140) has a master device (Managed Device 1-1, Managed Device 2-1, Managed Device 3-1, and Managed Device 4-1) and a number of slave managed devices (Managed Device 1-2 110-2 through Managed Device 1-N1 110-N1 for the cluster 1, Managed Device 2-2 120-2 through Managed Device 2-N2 120-N2 for the cluster 2, Managed Device 3-2 130-2 through Managed Device 3-N3 130-N3 for the cluster 3, and Managed Device 4-2 140-2 through Managed Device 4-N4 140-N4 for cluster 4). Each managed device (n-m, where n=1, 2, 3, and 4, and m=m1, m2, m3, and m4, where m1=1, 2, . . . , N1, m2=1, 2, . . . , N2, m3=1, 2, . . . , N3, and m4=1, 2, ..., N4) has a BMC n-m. All master managed device and the slave managed devices in each cluster have same configurations. Each master managed device has a master BMC, and each slave managed device has a slave BMC. Each slave BMC is communicatively connected to the synchronous BMC configuration system 100 through the master BMC of the cluster.

Figure 2:
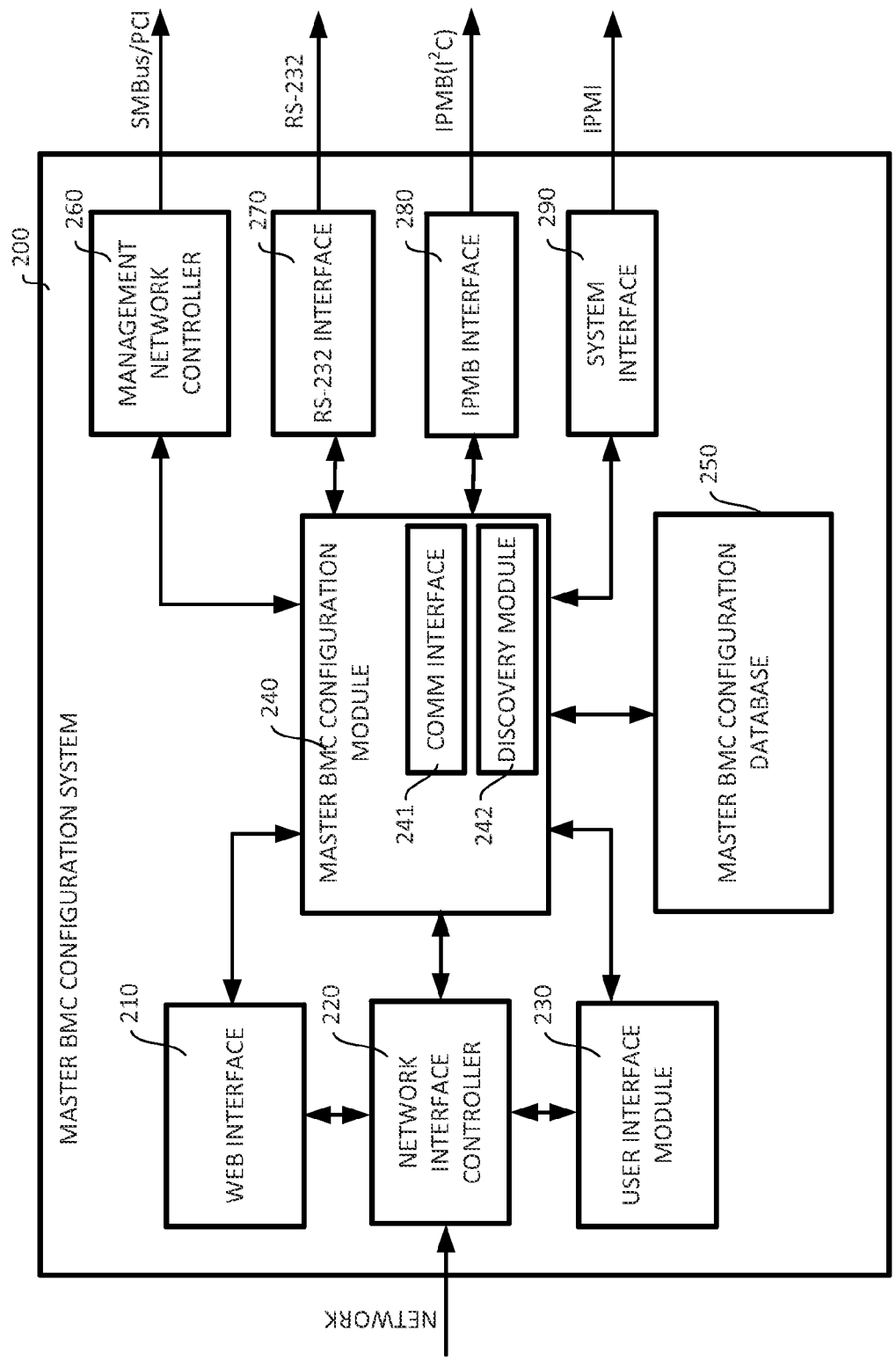
FIG. 2 shows a block diagram of the synchronous BMC configuration system according to one embodiment of the present disclosure.

FIG. 2 shows a detailed block diagram of a master BMC configuration system 200 according to one embodiment of the present disclosure. The master BMC configuration system 200 includes: (a) a set of input interfaces, (b) a master BMC configuration module 240, (c) a master BMC configuration database 250, and (d) a set of output interfaces to the master managed devices of clusters. The set of input interfaces includes: (a-1) a web interface module 210 configured to allow the user access and manage the BMCs on the clusters of managed devices over a designated website, (a-2) a network interface controller 220 configured to allow the user to access and manage the BMCs on the clusters of managed devices over a network, and (a-3) a user interface module 230 configured to allow user to receive BMC configuration information from a source over a network. The set of input interfaces is configured to receive BMC configuration information for at least the BMC configuration information for the BMC on the master managed device of the cluster from the user, the number of clusters, the number of managed devices in each cluster, and their IP addresses of the managed devices in each cluster.

The information received from the set of input user interfaces is then transmitted to the master BMC configuration module 240 and further stored in the master BMC configuration database 250. The master BMC configuration module 240 includes at least (b-1) a communication interface 241, and (b-2) a discovery module 242. The communication interface 241 is configured to interact with the user through the set of input interfaces to receive BMC configuration information, and with at least the BMC on the master managed device of each cluster to configure the BMCs on the master and slave managed devices belonging to each cluster of managed devices. The discovery module 242 is configured to allow the master BMC configuration module 240 to discover the one master managed devices in each cluster of manage devices networked with the synchronous BMC configuration system 100 so that the synchronous BMC configuration system 100 can configure at least the BMCs on the master managed device of each cluster. All master managed devices in various clusters networked with the synchronous BMC configuration system 100 are discovered by the discovery module 242 according to initial information received from the user, and system information of all managed devices in various clusters networked with the synchronous BMC configuration system 100 is stored in the master BMC configuration database 250. The initial information received from the user includes: the number of clusters, the number of managed devices in each of these clusters, the IP address of all managed devices (including one master managed device and one or more slave managed devices in various clusters networked with the synchronous BMC configuration system 100, and initial BMC configuration information for each of the BMC on the master managed devices for each cluster.

The BMC is configured to perform one or more of following platform management functions:
  Remote access to the BMC through the system's serial port and integrated network interface card (NIC)
  Fault logging and Simple Network Management Protocol (SNMP) alerting through Platform Event Filters (PEFs)
  Access to the system event log (SEL) and access to sensor status information
  Control of system functions, including power-up and power-down
  Support that is independent of the system's power up operating state
  Text console redirection for system setup, text based utilities, and operating system (OS) consoles
  Access to the Microsoft® Emergency Management Services (EMS), Microsoft Special Administration Console (SAC), and Red Hat® Linux® serial console interfaces using serial over LAN (SOL)

The master BMC in each cluster is also configured to perform one or more of following additional functions:
  Receive configuration information for the master BMC from the BMC configuration module of the synchronous BMC configuration system 100;
  Store configuration information for the master BMC in a local database;
  Perform the functions of the BMC configuration module at a master BMC level;
  Automatic Discovery of all slave managed devices within the cluster containing the master managed device, providing accurate inventory to BMC management system;
  Assign IP addresses to each of the slave managed devices within the cluster according to the configuration information for the master BMC from the BMC configuration module of the synchronous BMC configuration system 100
  Configure all slave BMCs on all managed devices within the cluster with the same configuration information for the master BMC; and
  Reporting to the synchronous BMC configuration system 100 whether the configuration of all slave BMCs is successful.

The BMC configuration includes one or more of following tasks:
  Configure users and access levels
  Configure the local area network (LAN), serial interfaces, SOL, and panel buttons
  Configure alerts and response actions and clear the SEL
  Assign globally unique identifiers (GUIDs) on all managed devices, and send the GUIDs to the master BMC configuration database 250

In certain embodiments, the synchronous BMC configuration system 100 includes one or more operating systems as well as one or more application programs. The operating system comprises a set of programs that control operations of the managed RS-232 or LAN/WAN devices using TCP/IP protocol. The application programs also provide a graphical user interface to the administrator. An application program is software that runs on top of the operating system software and uses computer resources made available through the operating system to perform application specific tasks desired by the user. The operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, the web interface 210 of the synchronous BMC configuration system 100 is configured to allow the user to remotely access through the internet. The web interface 210 may be accessed by the INTERNET EXPLORER web browser from MICROSOFT CORPORATION of Redmond, Wash., from a remote management computer (not shown in FIG. 1) to communicate over the Internet, local area network (LAN), wide area network (WAN) with the synchronous BMC configuration system 100.

In certain embodiments, the set of output interfaces of the master BMC configuration system 200 include at least one of (d-1) a management network controller 260, (d-2) a RS-232 interface 270, (d-3) an intelligent platform management bus (IPMB) interface 280, and (d-4) a system interface 290. The management network controller 260 provides a "side band" access to the BMCs on the master managed devices through management system bus such as an SMBus, a PCI management Bus. The RS-232 interface 270 is configured to allow user to access BMCs on the master managed devices through a local or remote access through serial connection, Modem connection, or serial on LAN connection such that the user can use a command line interface that enables a local management computer (not shown in FIG. 2) to communicate over the RS-232 connection with the synchronous BMC configuration system 100. The IPMB interface 280 allows the user to access BMCs on the master managed devices through IPMB, or Inter-Integrated Circuit ($I^2C$) bus, and they are used to access the sensors, control circuits, non-volatile storage space such as sensor data record (SDR), system event log (SEL), and field replaceable unit (FRU) of another chassis, other clusters of managed devices. The system interface 290 is configured to allow the master BMC configuration system to access system bus of the BMC of master managed devices. The system interface 290 includes $I^2C$ bus, system management bus (SMBus) and they are used to access the sensors, control circuits, non-volatile storage space such as SDR, SEL, and FRU of the managed device where the BMC is installed.

Figure 3:
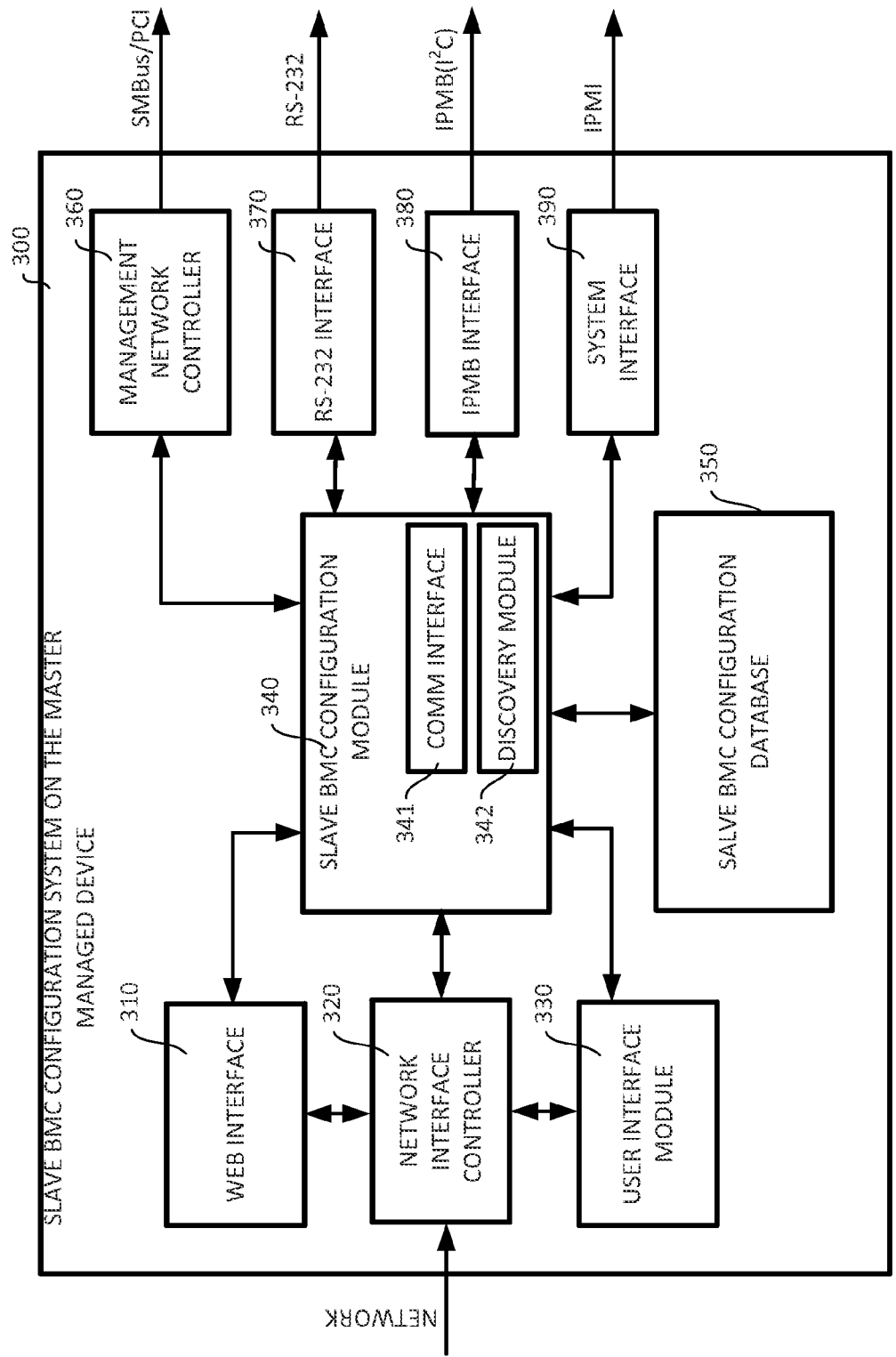
FIG. 3 shows a flow chart of operation of the synchronous BMC configuration system according to one embodiment of the present disclosure.

FIG. 3 shows a detailed block diagram of a slave BMC configuration system 300 according to one embodiment of the present disclosure. The slave BMC configuration system 300 includes: (a) a set of input interfaces, (b) a slave BMC configuration module 340, (c) a slave BMC configuration database 350, and (d) a set of output interfaces to the slave managed devices of a cluster. The set of input interfaces includes: (a-1) a web interface module 310 configured to allow the user access and manage the BMCs on the slave managed devices of a cluster over a designated website, (a-2) a network interface controller 320 configured to allow the user to access and manage the BMCs on all slave managed devices of the cluster over a network, and (a-3) the user interface module 330 configured to allow user to receive BMC configuration information from a source over a network. The set of input interfaces is configured to receive BMC configuration information from the master managed device for the BMC on all slave managed devices of the cluster from the user, the number of managed devices in the cluster, and their IP addresses of the managed devices in the cluster.

The BMC configuration information received from the set of input user interfaces is then transmitted to the slave BMC configuration module 340 and further stored in the slave BMC configuration database 350. The slave BMC configuration module 340 includes at least (b-1) a communication interface 341, and (b-2) a discovery module 342. The communication interface 341 is configured to interact with the user through the set of input interfaces to receive BMC configuration information, and with the BMCs on the slave managed device of the cluster to configure the BMCs on the slave managed devices belonging to the cluster. The discovery module 342 is configured to allow the slave BMC configuration module 340 to discover all slave managed devices in the cluster networked with the synchronous BMC configuration system 100 so that the synchronous BMC configuration system 100 can configure the BMCs on all slave managed device of the cluster. All slave managed devices in the cluster networked with the synchronous BMC configuration system 100 are discovered by the discovery module 342 according to initial information received from the user, and system information of all managed devices of the cluster networked with the synchronous BMC configuration system 100 is stored in the slave BMC configuration database 350. The initial information received from the user includes: the number of managed devices in each of these clusters, the IP address of all managed devices (including one master managed device and one or more slave managed devices) in the cluster networked with the synchronous BMC configuration system 100, and initial BMC configuration information for the BMCs on slave managed devices of the cluster.

In certain embodiment, the synchronous BMC configuration system 100 for automatically configuring BMCs installed on clusters of managed devices includes: (a) a master BMC configuration system 200; and (b) one or more clusters of managed devices. Each of the clusters of managed devices includes a master managed device 110-1, 120-1, 130-1, and 140-1 as shown in FIG. 1, and one or more slave managed devices 110-2, 110-3, . . . , 110-N1 for the cluster 1, one or more slave managed devices 120-2, 120-3, . . . , 120-N2 for the cluster 2, one or more slave managed devices 130-2, 130-3, . . . , 130-N3 for the cluster 3, and one or more slave managed devices 140-2, 140-3, . . . , 140-N4 for the cluster 4. The master managed device and the slave managed devices in each cluster are substantially same type of managed devices and have substantially same configuration. For example, the master managed device 110-1 of the cluster 1 (110), are the same managed device as the slave managed devices 110-2, 110-3, . . . , 110-N1 of the cluster 1 (110). The master managed device 120-1 of the cluster 2 (120), are the same managed device as the slave managed devices 120-2, 120-3, . . . , 120-N2 of the cluster 2 (120). Each of the master managed device and the slave managed devices has a BMC installed for managed device system management. Since each of the clusters of managed devices has the same type of the managed devices, each cluster of managed devices has one set of BMC configuration information.

In certain embodiments, the master BMC configuration system 200 includes: (a) a set of input interfaces, (b) a master BMC configuration database 250, (c) a set of output interfaces, and (d) a master BMC configuration module 240. The set of input interfaces is configured to communicate with a BMC configuration device (not shown in FIGS. 1 and 2) over a network and allow a user to provide one set of BMC configuration information for each of clusters of managed devices. The set of input interfaces includes: (a-1) a web interface module 210 configured to allow the user access and manage the BMCs on the clusters of managed devices over a designated website, (a-2) a network interface controller 220 configured to allow the user to access and manage the BMCs on the clusters of managed devices over a network, and (a-3) a user interface module 230 configured to allow user to receive BMC configuration information from a source over a network. The set of input interfaces is configured to receive BMC configuration information for at least the BMC configuration information for the BMC on the master managed device of the cluster from the user, the number of clusters, the number of managed devices in each cluster, and their IP addresses of the managed devices in each cluster.

In certain embodiments, the master BMC configuration database 250 is configured to store one set of BMC configuration information for each of clusters of managed devices received from the set of input interfaces. The master BMC configuration module 240 is configured to configure the BMCs installed on each of clusters of managed devices including the master managed device and the slave managed devices through the set of output interfaces. In certain embodiments, the set of output interfaces of the master BMC configuration system 200 include at least one of (a) a management network controller 260, (b) a RS-232 interface 270, (c) an intelligent platform management bus (IPMB) interface 280, and (d) a system interface 290. The management network controller 260 provides a "side band" access to the BMCs on the master managed devices through management system bus such as an SMBus, a PCI management Bus. The RS-232 interface 270 is configured to allow user to access BMCs on the master managed devices of each of clusters of the managed devices through a local or remote access through serial connection, Modem connection, or serial on LAN connection such that the user can use a command line interface that enables a local management computer (not shown in FIG. 2) to communicate over the RS-232 connection with the synchronous BMC configuration system 100. The IPMB interface 280 allows the user to access BMCs on the master managed devices of each of clusters of the managed devices through IPMB, or Inter-Integrated Circuit ($I^2C$) bus, and they are used to access the sensors, control circuits, non-volatile storage space such as sensor data record (SDR), system event log (SEL), and field replaceable unit (FRU) of another chassis, other clusters of managed devices. The system interface 290 is configured to allow the master BMC configuration system to access system bus of the BMC of master managed devices of each of clusters of the managed devices. The system interface 290 includes $I^2C$ bus, system management bus (SMBus) and they are used to access the sensors, control circuits, non-volatile storage space such as SDR, SEL, and FRU of the master managed device of each of clusters of the managed devices.

In certain embodiments, the BMC Configuration information for the synchronous BMC configuration system 100 includes: (a) number of clusters of managed devices, and (b) BMC configuration information for each cluster of managed devices. The BMC configuration information for each cluster of managed devices includes: (a) the type of the managed devices of the cluster, (b) name of the manufacturer, (c) model number, (d) management information base (MIB) file of the managed devices of the cluster, (e) number of slave managed devices in the cluster, (f) the IP addresses of the master manage device and the slave managed devices of the cluster, (g) globally unique identification number of the master managed device and the slave managed devices of the cluster.

The BMC Configuration information for the synchronous BMC configuration system 100 is stored in the master BMC configuration database 250 of the master BMC configuration system 200. The BMC configuration information of each cluster of managed devices can be entered manually through the user interface module. The BMC configuration information of each cluster of managed devices can also be imported automatically from a pre-edited file. The pre-edited files include the BMC configuration information exported from a cluster that contains substantially same type of managed devices and substantially same configuration as the managed devices of the cluster. The pre-edited file can be at least one of a text file, an excel file, and an XML file.

In certain embodiments, the master BMC configuration module 240 includes: (a) a communication interface 241, and (b) a discovery module 242. The communication interface 241 facilitates the communication from the user through the set of input interfaces, and to the master and slave managed devices of each cluster of managed devices. The discovery module 242 of the master BMC configuration module 240 is used to discover all master managed devices of each cluster of managed devices based on the BMC configuration information received from the user and/or retrieved from the master BMC configuration database 250, such as the number of clusters, the number of slave managed devices in each cluster of managed devices, the IP addresses of the master and slave managed devices of each cluster of managed devices.

In certain embodiments, the master BMC configuration module 240 can receive BMC Configuration information from at least one of the input interfaces of the master BMC configuration system 200. In certain embodiments, the master BMC configuration module 240 can allow the user to modify the received BMC configuration information if necessary. In certain embodiments, the master BMC configuration module 240 can store the BMC configuration information in the master BMC configuration database 250 of the master BMC configuration system 200. In certain embodiments, the master BMC configuration module 240 can discover a master managed device in each cluster of managed devices through the discovery module 242 of the master BMC configuration module 240 according to the number of clusters of managed devices, and their associated IP addresses. In certain embodiments, the master BMC configuration module 240 can configure the BMC of the master managed device of each cluster of managed devices according to the BMC configuration information for the cluster using the mater BMC configuration module 240 of the master BMC configuration system 200. In certain embodiments, the master BMC configuration module 240 can transmit the BMC configuration information for the cluster to the master managed device of each cluster of managed devices through the set of output interfaces of the master BMC configuration system. In certain embodiments, the master BMC configuration module 240 can install a slave BMC configuration system on the master managed device of each cluster of managed devices. In certain embodiments, the master BMC configuration module 240 can instruct each slave BMC configuration system on the master managed device of each cluster of managed devices to configure the BMCs on all slave managed devices of the cluster of managed devices according to the BMC configuration information for the cluster.

In certain embodiments, the set of output interfaces 260, 270, 280, and 290 of the master BMC configuration system 200 is used by the master BMC configuration system 200 to install a slave BMC configuration system 300 on each of the master managed devices of each cluster of managed devices.

In certain embodiments, the slave BMC configuration system 300 of the master manage device of each cluster of managed devices includes: (a) a set of input interfaces of the slave BMC configuration system 300, (b) a slave BMC configuration database 350, (c) a set of output interfaces of the slave BMC configuration system 300, and (d) a slave BMC configuration module 340. The set of input interfaces of the slave BMC configuration system 300 is configured to communicate with the master BMC configuration system 200 of each master manage device of the cluster over a network and receive BMC configuration information for the slave managed devices of the cluster. The slave BMC configuration database 350 is configured to store the BMC configuration information for the slave managed devices of the cluster received from the at least one of the input interfaces of the slave BMC configuration system 300. The set of output interfaces of the slave BMC configuration system 300 is configured to communicate with the each salve managed devices of the cluster. The slave BMC configuration module 340 is constructed to configure the BMCs on each of the slave managed devices of the cluster through the plurality of output interfaces of the slave BMC configuration system 300.

In certain embodiments, the set of input interfaces of the slave BMC configuration system 300 includes at least one of: (a) a user interface module 330 of the slave BMC configuration system 300 for a local user to input BMC configuration information and configure the BMCs of the slave managed devices of the cluster, (b) a network interface controller 320 of the slave BMC configuration system 300 to allow the user to communicate with the slave BMC configuration module 340 over a network, and (c) a web interface module 310 of the slave BMC configuration system 300 configured for a remote user to configure the BMCs of the slave managed devices of the cluster through the network interface controller of the slave BMC configuration system 320 over the network.

In certain embodiments, the set of output interfaces of the slave BMC configuration system 300 includes at least one of: (a) a management network controller configured to provide a "side band" access to the BMC of the slave managed devices in the cluster through a management system bus, and the management system bus includes at least one of an SMBus, and a PCI management Bus, (b) a RS-232 interface configured to allow user to access BMC of the slave managed devices in the cluster through a local or remote access through a serial connection, a Modem connection, or a serial on LAN connection such that the user can use a command line interface that enables the master BMC configuration system to communicate over the RS-232 connection with the BMCs of the slave managed devices in the cluster, (c) an IPMB interface configured to allow the user to access other remote BMCs of the slave manage devices in the cluster through at least one of the IPMB and Inter-Integrated Circuit (I2C) bus, and (d) a system interface configured to allow the slave BMC configuration module 340 to access system bus of the slave managed devices in the cluster through at least one of the I²C bus and system management bus (SMBus). The IPMB, the I²C bus, and the SMBus are also used to access the sensors, control circuits, non-volatile storage space of slave managed devices in the cluster. Each non-volatile storage space of slave managed devices in the cluster has at least one of a sensor data record (SDR), a system event log (SEL), and a field replaceable unit (FRU).

In certain embodiments, the slave BMC configuration module 340 includes: (a) a communication interface 341, and (b) a discovery module 342. The communication interface 341 facilitates the communication from the user through the set of input interfaces, and to the slave managed devices of each cluster of managed devices. The discovery module 342 of the slave BMC configuration module 340 is used to discover all slave managed devices of each cluster of managed devices based on the BMC configuration information received from the user and/or retrieved from the slave BMC configuration database 350, such as the number of slave managed devices in each cluster of managed devices, the IP addresses of the slave managed devices of each cluster of managed devices.

In certain embodiments, the slave BMC configuration module 340 can receive BMC Configuration information from at least one of the input interfaces of the slave BMC configuration system 300. In certain embodiments, the slave BMC configuration module 340 can allow the user to modify the received BMC configuration information if necessary. In certain embodiments, the slave BMC configuration module 340 can store the BMC configuration information in the slave BMC configuration database 350 of the slave BMC configuration system 300. In certain embodiments, the slave BMC configuration module 340 can discover all slave managed devices in the cluster through the discovery module 342 of the slave BMC configuration module 340 according to the number of slave managed devices in the cluster, and their associated IP addresses. In certain embodiments, the slave BMC configuration module 340 can receive instructions from the master BMC configuration system 200 to configure all slave managed devices in the cluster. In certain embodiments, the slave BMC configuration module 340 can configure the BMCs of all slave managed devices of the cluster according to the BMC configuration information for the cluster using the slave BMC configuration module 340 of the slave BMC configuration system 300.

Figure 4:
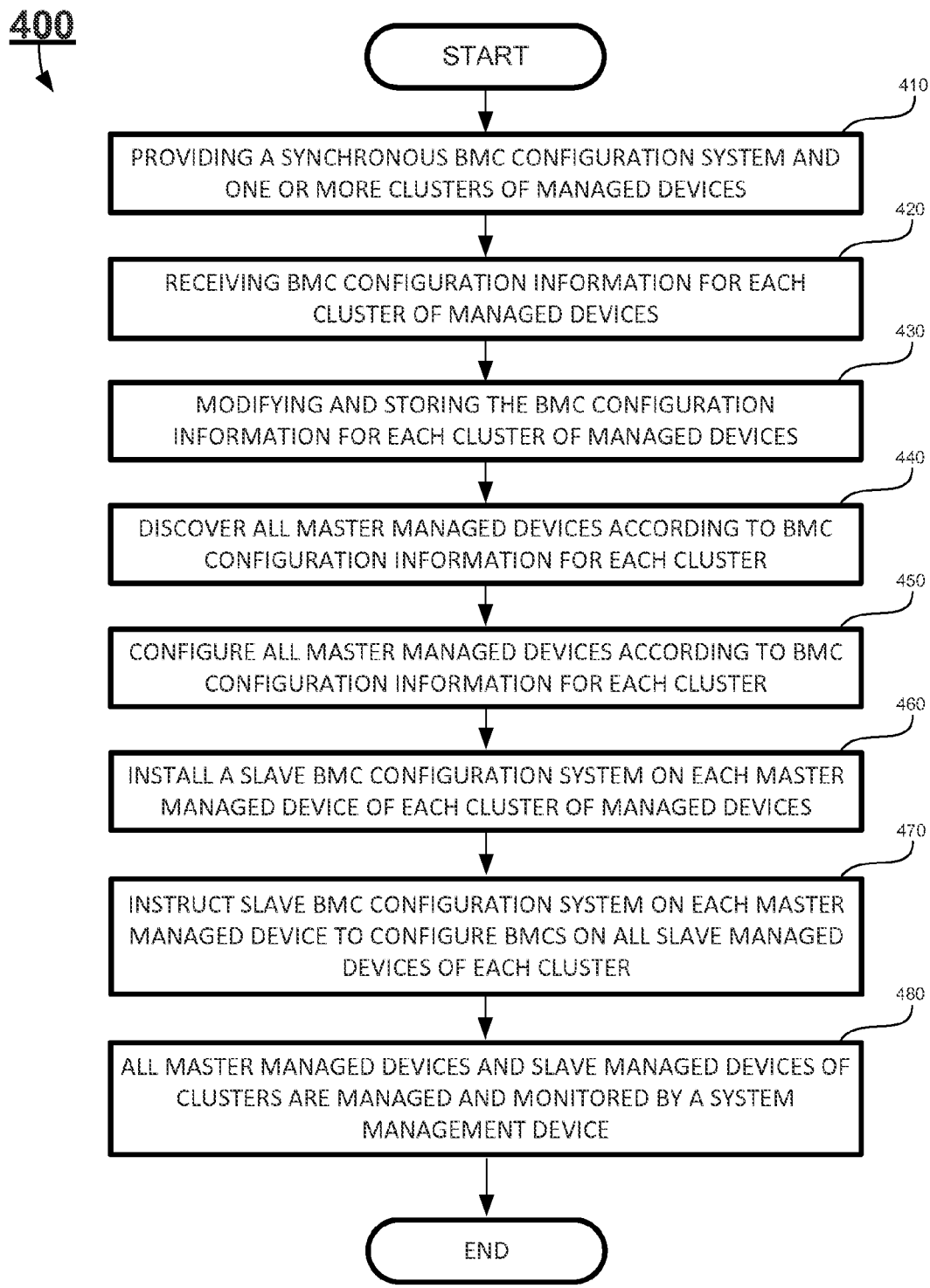
FIG. 4 shows a flow chart of the operation of a master BMC configuration system according to one embodiment of the present disclosure.

Referring now to FIG. 4, a flow chart of the operation of a master BMC configuration system is shown according to one embodiment of the present disclosure.

At operation 410, a synchronous BMC configuration system is provided to one or more clusters of managed devices for automatically configuring BMCs installed on the clusters of managed devices. Each cluster of managed devices has one master managed device and one or more slave managed devices. The master managed device and all slave managed devices in each cluster are of the same type of managed devices, and these managed devices are configured with a set of BMC configuration information for each cluster of managed devices.

At operation 420, BMC configuration information is entered by a user using a user interface module of a master BMC configuration system, or importing a set of pre-edited files exported from another BMC configuration system that has similar managed devices and configuration. The BMC configuration information includes: number of clusters of managed devices; and one set of BMC configuration information for each cluster of managed devices. The BMC configuration information of each cluster of managed devices can be entered manually through the user interface module. The BMC configuration information of each cluster of managed devices can also be imported automatically from a pre-edited file. The pre-edited files include the BMC configuration information exported from a cluster that contains substantially same type of managed devices and substantially same configuration as the managed devices of the cluster. The pre-edited file can be at least one of a text file, an excel file, and an XML file.

At operation 430, when it is necessary, the user can edit/modify the received BMC configuration information, and the edited/modified BMC configuration information is then stored in a master BMC configuration database of the master BMC configuration system. The BMC configuration information for each cluster of managed devices includes: (a) the type of the managed devices of the cluster, (b) name of the manufacturer, (c) model number, (d) management information base (MIB) file of the managed devices of the cluster, (e) number of slave managed devices in the cluster, (f) the IP addresses of the master manage device and the slave managed devices of the cluster, (g) globally unique identification number of the master managed device and the slave managed devices of the cluster.

At operation 440, the master BMC configuration system discovers one master managed device in each cluster of managed devices through a discovery module of the master BMC configuration system according to the number of clusters of managed devices, and their associated IP addresses. The information of the discovered master managed devices is stored at the master BMC configuration database of the master BMC configuration system, identified by the globally unique identification number (GUIDs) of the master managed devices of the clusters.

At operation 450, the master BMC configuration system goes through each of the discovered managed devices of each cluster, and configures each of the discovered managed devices of each cluster according to the BMC configuration information of the cluster using a mater BMC configuration module of the master BMC configuration system. Once the BMC on each master managed device is configured properly, the BMC configuration is stored in a slave BMC configuration database on the master managed device of each cluster.

At operation 460, the master BMC configuration system installs a slave BMC configuration system on the master managed device of each cluster of managed devices. The slave BMC configuration system is used to configure the remaining all BMCs on all slave managed devices of the cluster. The slave BMC configuration system of the master manage device of each cluster includes: (a) a set of input interfaces, (b) a slave BMC configuration database, (c) a set of output interfaces, and (d) a slave BMC configuration module. The set of input interfaces is configured to communicate with the master BMC configuration system of each master manage device of the cluster over a network and receive BMC configuration information for the slave managed devices of the cluster. The slave BMC configuration database is configured to store the BMC configuration information for the slave managed devices of the cluster received from the at least one of the input interfaces of the slave BMC configuration system. The set of output interfaces of the slave BMC configuration system is configured to communicate with the each salve managed devices of the cluster. The slave BMC configuration module is constructed to configure the BMCs on each of the slave managed devices of the cluster through the plurality of output interfaces of the slave BMC configuration system.

At operation 470, each slave BMC configuration system on the master managed device of each cluster is instructed to configure the BMCs on all slave managed devices of the cluster according to the BMC configuration information for the cluster currently stored in the slave BMC configuration database.

At operation 480, once the master managed device and all slave managed devices in each cluster are configured, a system management device connected to these clusters of managed devices over a network can monitor and manage these clusters of managed devices.

Figure 5:
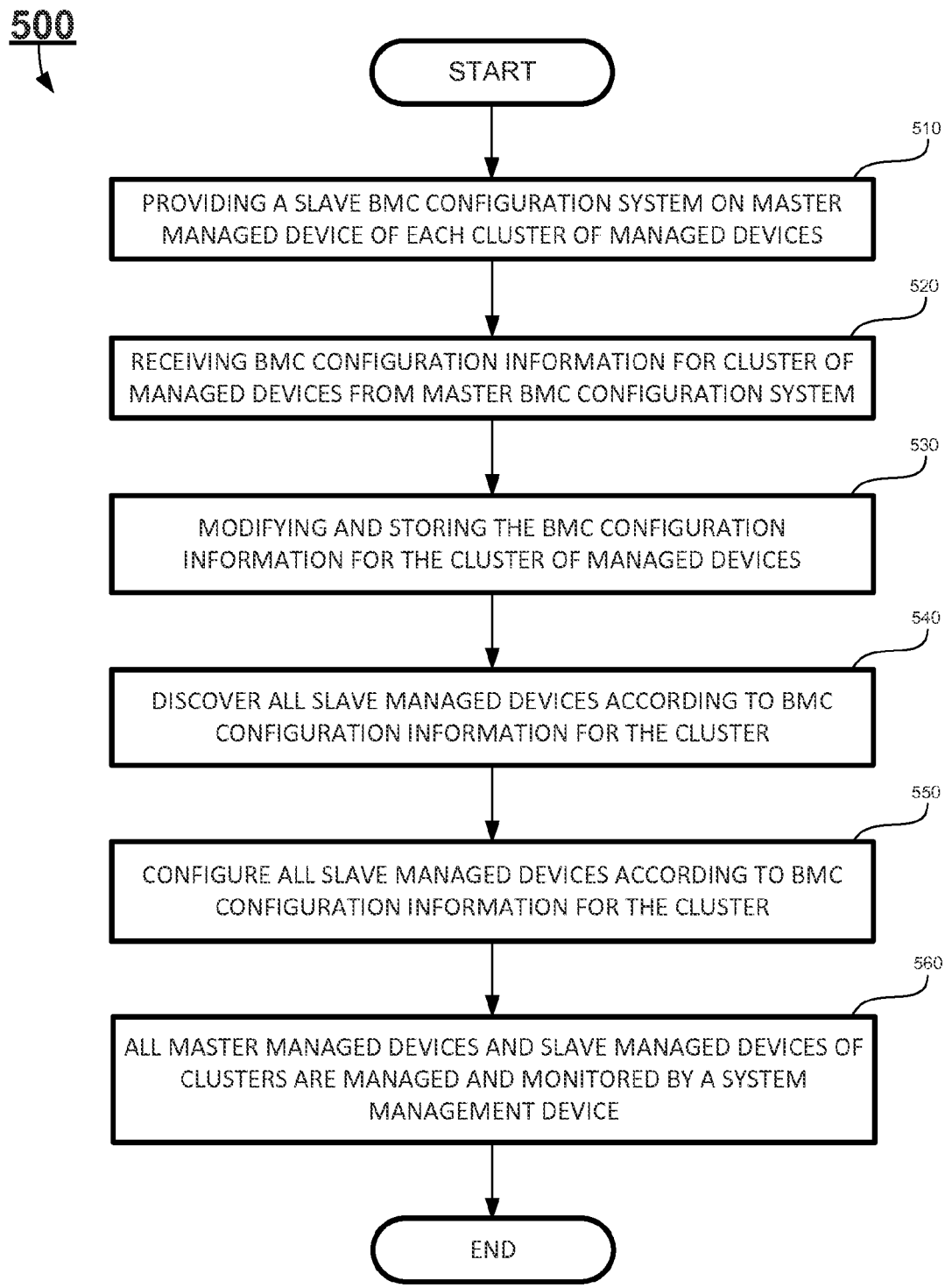
FIG. 5 shows a flow chart of the operation of a slave BMC configuration system according to one embodiment of the present disclosure.

Referring now to FIG. 5, a flow chart of the operation of a slave BMC configuration system is shown according to one embodiment of the present disclosure.

At operation 510, a slave BMC configuration system is installed by a master BMC configuration system for automatically configuring BMCs installed on all slave managed devices of the cluster. Each cluster of managed devices has one master managed device where the slave BMC configuration system is installed. The master managed device and all slave managed devices in each cluster are of the same type of managed devices, and these managed devices are configured with a set of BMC configuration information for each cluster of managed devices.

At operation 520, BMC configuration information is transmitted to the slave BMC configuration system on the master managed device during the configuration of the BMC on the master managed device of the cluster. The BMC configuration information can be transmitted by a user using a user interface module of a master BMC configuration system, or importing a set of pre-edited files exported from another BMC configuration system that has similar managed devices and configuration. The BMC configuration information includes: number of slave managed devices in the cluster; and one set of BMC configuration information for the cluster. The BMC configuration information of each cluster of managed devices can be entered manually through the user interface module, or imported automatically from a pre-edited file. The pre-edited files include the BMC configuration information exported from a cluster that contains substantially same type of managed devices and substantially same configuration as the managed devices of the cluster. The pre-edited file can be at least one of a text file, an excel file, and an XML file.

At operation 530, when it is necessary, the user can edit/modify the received BMC configuration information for the cluster, and the edited/modified BMC configuration information is then stored in a slave BMC configuration database of the slave BMC configuration system. The BMC configuration information for each cluster of managed devices includes: (a) the type of the managed devices of the cluster, (b) name of the manufacturer, (c) model number, (d) management information base (MIB) file of the managed devices of the cluster, (e) number of slave managed devices in the cluster, (f) the IP addresses of the master manage device and the slave managed devices of the cluster, (g) globally unique identification number of the master managed device and the slave managed devices of the cluster.

At operation 540, the slave BMC configuration system discovers all slave managed devices in the cluster through a discovery module of the slave BMC configuration system according to the number of slave managed devices, and their associated IP addresses. The information of the discovered master managed devices is stored at the slave BMC configuration database of the slave BMC configuration system, identified by the globally unique identification number (GUIDs) of the slave managed devices of the cluster.

At operation 550, the slave BMC configuration system goes through each of the discovered slave managed devices of the cluster, and configures each discovered slave managed devices of the cluster according to the BMC configuration information of the cluster using a slave BMC configuration module of the master BMC configuration system. Once the BMC on each slave managed device is configured properly, the BMC configuration information of the slave managed devices is stored in the slave BMC configuration database on the master managed device of the cluster.

At operation 560, once all slave managed devices in the cluster are configured, a system management device connected to the cluster of managed devices over a network can monitor and manage these clusters of managed devices.

The present disclosure also related to a non-transitory computer storage medium. The non-transitory computer storage medium contains computer-executable instructions. When these computer-executable instructions are executed by a processor of a master BMC configuration system, the computer-executable instructions cause the processor to perform one or more of following functions. In certain embodiments, the computer-executable instructions cause the processor to receive BMC Configuration information from one of the input interfaces of the master BMC configuration system. In certain embodiments, the computer-executable instructions cause the processor to allow the user to modify the received BMC configuration information if the user desires to do so. In certain embodiments, the computer-executable instructions cause the processor to store the BMC configuration information in the master BMC configuration database of the master BMC configuration system. In certain embodiments, the computer-executable instructions cause the processor to discover a master managed device in each cluster of managed devices through the discovery module of the master BMC configuration module according to the number of clusters of managed devices, and their associated IP addresses. In certain embodiments, the computer-executable instructions cause the processor to configure the BMC of the master managed device of each cluster of managed devices according to the BMC configuration information for the cluster using the mater BMC configuration module of the master BMC configuration system. In certain embodiments, the computer-executable instructions cause the processor to transmit the BMC configuration information for the cluster to the master managed device of each cluster of managed devices through the set of output interfaces of the master BMC configuration system. In certain embodiments, the computer-executable instructions cause the processor to install a slave BMC configuration system on the master managed device of each cluster of managed devices. In certain embodiments, the computer-executable instructions cause the processor to instruct each slave BMC configuration system on the master managed device of each cluster of managed devices to configure the BMCs on all slave managed devices of the cluster of managed devices according to the BMC configuration information for the cluster.

In certain embodiments, the BMC Configuration information includes: (a) number of clusters of managed devices, and (b) BMC configuration information for each cluster of managed devices. The BMC configuration information for each cluster of managed devices includes: (a) the type of the managed devices of the cluster, (b) name of the manufacturer, (c) model number, (d) management information base (MIB) file of the managed devices of the cluster, (e) number of slave managed devices in the cluster, (f) the IP addresses of the master manage device and the slave managed devices of the cluster, (g) globally unique identification number of the master managed device and the slave managed devices of the cluster.

The present disclosure also related to another non-transitory computer storage medium. The non-transitory computer storage medium also contains computer-executable instructions. When these computer-executable instructions are executed by a processor of a slave BMC configuration system, the computer-executable instructions cause the processor to perform one or more of the following functions. In certain embodiments, the computer-executable instructions cause the processor to receive BMC Configuration information from at least one of the input interfaces of the slave BMC configuration system. In certain embodiments, the computer-executable instructions cause the processor to allow the user to modify the received BMC configuration information if the user desires to do so. In certain embodiments, the computer-executable instructions cause the processor to store the BMC configuration information in the slave BMC configuration database of the slave BMC configuration system. In certain embodiments, the computer-executable instructions cause the processor to discover all slave managed devices in the cluster through a discovery module of a slave BMC configuration module according to the number of slave managed devices in the cluster, and their associated IP addresses. In certain embodiments, the computer-executable instructions cause the processor to receive instructions from a master BMC configuration system to configure all slave managed devices in the cluster. In certain embodiments, the computer-executable instructions cause the processor to configure the BMCs of all slave managed devices of the cluster according to the BMC configuration information for the cluster using the slave BMC configuration module of the slave BMC configuration system.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A synchronous BMC configuration system for automatically configuring a plurality of baseboard management controllers (BMCs) installed on a plurality of clusters of managed devices, comprising:
   a master BMC configuration system; and
   a plurality of clusters of managed devices;
   wherein each cluster of the plurality of clusters of managed devices comprises a master managed device, and a plurality of slave managed devices, the master managed device and the plurality of slave managed devices are substantially same type of managed devices and have substantially same configuration, each master managed device and the plurality of slave managed devices has a BMC installed for system management, and each cluster of managed devices has one set of BMC configuration information; and
   wherein the master BMC configuration system is configured to transmit the BMC configuration information for each cluster to each master managed device of each cluster and install a slave BMC configuration system on each master managed device of each cluster of managed devices for configuring the plurality of the slave managed devices of each cluster and for allowing a user to communicate with a slave BMC configuration module constructed in each master managed device of each cluster.

2. The synchronous BMC configuration system of claim 1, wherein the master BMC configuration system comprises:
   a plurality of input interfaces configured to communicate with a BMC configuration device over a network and allow the user to provide the one set of BMC configuration information to each of the plurality of clusters of managed devices;

a master BMC configuration database configured to store the set of BMC configuration information for each of the plurality of clusters of managed devices received from the plurality of input interfaces;

a plurality of output interfaces configured to communicate with each master managed device of each cluster of managed devices; and a master BMC configuration module constructed to configure the BMCs installed on each master managed device of each cluster through the plurality of output interfaces.

3. The synchronous BMC configuration system of claim 2, wherein the plurality of input interfaces of the master BMC configuration system comprises at least one of:

a user interface module for a local user to input BMC configuration information and configure the BMCs installed on the plurality of clusters of managed devices;

a network interface controller to allow the user to communicate with the master BMC configuration module over a network; and a web interface module for a remote user to configure the BMCs installed on the plurality of clusters of managed devices through the network interface controller over the network.

4. The synchronous BMC configuration system of claim 3, wherein the plurality of output interfaces of the master BMC configuration system comprises at least one of:

a management network controller configured to provide a "side band" access to the BMCs of a plurality of master managed devices of the plurality of clusters through a management system bus, wherein the management system bus comprises at least one of an SMBus, and a PCI management Bus;

a RS-232 interface configured to allow user to access the BMCs of the plurality of master managed devices of the plurality of clusters through a local or remote access through a serial connection, a Modem connection, or a serial on LAN connection such that the user can use a command line interface that enables the BMC configuration device to communicate over the RS-232 connection with the BMCs of the plurality of master managed devices of the plurality of clusters;

an IPMB interface configured to allow the user to access other BMCs of the plurality of master managed devices of the plurality of clusters through at least one of the IPMB and Inter-Integrated Circuit (I²C) bus; and a system interface configured to allow the master BMC configuration module to access system bus of the BMCs of the plurality of master managed devices of the plurality of clusters through at least one of the I²C bus and system management bus (SMBus), wherein the IPMB, the I²C bus, and the SMBus are also used to access the sensors, control circuits, non-volatile storage space of the BMCs of the plurality of master managed devices of the plurality of clusters having at least one of a sensor data record (SDR), a system event log (SEL), and a field replaceable unit (FRU).

5. The synchronous BMC configuration system of claim 4, wherein the BMC configuration information comprises:
the type of the managed devices of the cluster;
a name of the manufacturer;
a model number;
a management information base (MIB) file of the managed devices of the cluster;
a number of slave managed devices in the cluster;
an internet protocol (IP) addresses of the master manage device and the slave managed devices of the cluster; and
a globally unique identification number of the master managed device and the slave managed devices of the cluster.

6. The synchronous BMC configuration system of claim 5, wherein the BMC configuration information is entered manually through the user interface module, or automatically imported from a pre-edited file, wherein the pre-edited files comprises the BMC Configuration information exported from a cluster that contains substantially same type of managed device and substantially same configuration as the plurality of managed devices with the cluster.

7. The synchronous BMC configuration system of claim 6, wherein the pre-edited file comprises at least one of a text file, an excel file, and an XML file.

8. The synchronous BMC configuration system of claim 7, wherein the master BMC configuration module is configured to:

receive BMC Configuration information from at least one of the input interfaces of the master BMC configuration system;

allow the user to modify the received BMC configuration information;

store the BMC configuration information in the master BMC configuration database of the master BMC configuration system;

discover the master managed devices in each of the plurality of clusters of managed devices through the discovery module of the master BMC configuration module according to the number and the associated IP addresses of the clusters of managed devices;

configure the BMC of the master managed device of each cluster of managed devices according to the BMC configuration information for the cluster using the mater BMC configuration module of the master BMC configuration system;

transmit the BMC configuration information for the cluster to each master managed device of each cluster through the plurality of output interfaces of the master BMC configuration system;

install the slave BMC configuration system on the master managed device of each cluster of managed devices; and instruct each slave BMC configuration system on the master managed device of each cluster of managed devices to configure the BMCs on all slave managed devices of the cluster of managed devices according to the BMC configuration information for the cluster.

9. The synchronous BMC configuration system of claim 8, wherein the slave BMC configuration system installed in each master managed device comprises:

a plurality of input interfaces of the slave BMC configuration system configured to communicate with the master BMC configuration system of each master manage device of the cluster over a network and receive BMC configuration information for the slave managed devices of the cluster;

a slave BMC configuration database configured to store the set of BMC configuration information for each slave managed device of the cluster received from the at least one of the plurality of output interfaces of the master BMC configuration system;

a plurality of output interfaces of the slave BMC configuration system configured to communicate with the each salve managed device of the cluster; and the slave BMC configuration module constructed to configure the BMCs installed on each slave managed device of the cluster through the plurality of output interfaces of the slave BMC configuration system.

10. The synchronous BMC configuration system of claim 9, wherein the plurality of input interfaces of the slave BMC configuration system comprises at least one of:
a user interface module for a local user to input BMC configuration information and configure the BMCs on the slave managed devices of the cluster;
a network interface controller of the master managed device to allow the user to communicate with the slave BMC configuration module over a network; and
a web interface module of the slave BMC configuration system configured for a remote user to configure the BMCs on the slave managed devices of the cluster through the network interface controller of the slave BMC configuration system over the network.

11. The synchronous BMC configuration system of claim 9, wherein the plurality of output interfaces of the slave BMC configuration system comprises at least one of:
a management network controller configured to provide a "side band" access to the BMCs of the slave managed devices of the cluster through a management system bus, wherein the management system bus comprises at least one of an SMBus, and a PCI management Bus;
a RS-232 interface configured to allow user to access BMC BMCs of the slave managed devices of the cluster through a local or remote access through a serial connection, a Modem connection, or a serial on LAN connection such that the user can use a command line interface that enables the master BMC configuration system to communicate over the RS-232 connection with the BMCs of the slave managed devices of the cluster;
an IPMB interface configured to allow the user to access other remote BMCs of the slave managed devices of the cluster through at least one of the IPMB and Inter-Integrated Circuit ($I^2C$) bus; and
a system interface configured to allow the slave BMC configuration module to access system bus of the slave managed devices of the cluster through at least one of an $I^2C$ bus and a system management bus (SMBus),
wherein the IPMB, the $I^2C$ bus, and the SMBus are also used to access the sensors, control circuits, non-volatile storage space of slave managed devices in the cluster, and each non-volatile storage space of slave managed devices of the cluster has at least one of a sensor data record (SDR), a system event log (SEL), and a field replaceable unit (FRU).

12. The synchronous BMC configuration system of claim 9, wherein the slave BMC configuration module is configured to:
receive BMC Configuration information from at least one of the input interfaces of the slave BMC configuration system;
allow the user to modify the received BMC configuration information;
store the BMC configuration information in the slave BMC configuration database of the slave BMC configuration system;
discover all slave managed devices of the cluster through the discovery module of the slave BMC configuration module according to the number and the associated IP addresses of the slave managed devices of the cluster;
receiving instructions from the master BMC configuration system to configure all BMCs of the slave managed devices of the cluster; and
configure the BMCs of the slave managed devices of the cluster according to the BMC configuration information for the cluster using the slave BMC configuration module of the slave BMC configuration system.

13. The synchronous BMC configuration system of claim 1, wherein the master managed device and the slaved managed devices in each cluster of managed devices have a same set of BMC configuration information, and for each cluster of managed devices, when the same set of BMC configuration information of the master managed device is updated to have an updated BMC configuration information, the same set of BMC configuration information of each of the slave managed devices is also updated to have the same updated BMC configuration information.

14. A method for automatically configuring a plurality of baseboard management controllers (BMCs) installed on a plurality of clusters of managed devices by a synchronous BMC configuration system, comprising:
providing a synchronous BMC configuration system having a master BMC configuration system and a plurality of clusters of managed devices, wherein each of the plurality of clusters of managed devices has a master managed device, and a plurality of slave managed devices;
entering BMC configuration information by a user using a user interface module of the master BMC configuration system, or importing a set of pre-edited files exported from another BMC configuration system that has similar managed devices and configuration, wherein the BMC configuration information comprises: number of clusters of managed devices; and BMC configuration information of each of the plurality of clusters of managed devices;
storing the BMC configuration information of the BMCs of the master managed devices of the plurality of clusters of managed devices in a master BMC configuration database of the master BMC configuration system;
discovering one master managed device in each of the plurality of clusters of managed devices through a discovery module of the master BMC configuration system according to the number and the associated IP addresses of the clusters of managed devices;
configuring the BMCs of all master managed device of the plurality of clusters according to the BMC configuration information for each cluster using the mater BMC configuration module of the master BMC configuration system;
transmitting, by the master BMC configuration system, the BMC configuration information for each cluster to each master managed device of each cluster and installing, by the master BMC configuration system, one slave BMC configuration system on each master managed device of each cluster of managed devices for configuring the plurality of the slave managed devices of each cluster and for allowing the user to communicate with a slave BMC configuration module constructed in each master managed device of each cluster; and
instructing the slave BMC configuration system on each master managed device of each cluster of the managed devices to configure BMCs on the master managed devices of each cluster of managed devices according to the BMC configuration information for the cluster;

wherein the master managed device and the plurality of slave managed devices in a same cluster are substantially same type of managed devices, and each has a BMC installed for system management, and wherein each cluster of managed devices has one set of BMC configuration information.

15. The method of claim 14, further comprising:

allowing the user to modify the received BMC configuration information.

16. The method of claim 14, wherein the master BMC configuration system comprises:

a plurality of input interfaces configured to communicate with a BMC configuration device over a network and allow a user to provide BMC configuration information and BMC configuration information for the BMCs of each of the plurality of clusters of managed devices;

a master BMC configuration database configured to store the BMC configuration information and BMC configuration information of each of the plurality of clusters of managed devices received from the plurality of input interfaces;

a plurality of output interfaces configured to communicate with each master managed devices of the plurality of clusters of managed devices; and a master BMC configuration module constructed to configure the BMCs on each of the master managed device of the plurality of clusters of managed devices through the plurality of output interfaces.

17. The method of claim 16, wherein the BMC configuration information for each cluster of managed devices comprises:

the type of the managed devices of the cluster;
a name of the manufacturer;
a model number;
a management information base (MIB) file of the managed devices of the cluster;
a number of slave managed devices in the cluster;
an internet protocol (IP) addresses of the master manage device and the slave managed devices of the cluster; and
a globally unique identification number of the master managed device and the slave managed devices of the cluster.

18. The method of claim 17, wherein the BMC configuration information of each cluster of managed devices is entered manually through the user interface module, or automatically imported from a pre-edited file, wherein the pre-edited files comprises the BMC configuration information exported from a cluster that contains substantially same type of managed devices and substantially same configuration as the plurality of managed devices with the cluster.

19. The method of claim 18, wherein the pre-edited file comprises at least one of a text file, an excel file, and an XML file.

20. The method of claim 19, wherein the master BMC configuration module is configured to:

receive the BMC configuration information from at least one of the input interfaces of the master BMC configuration system;

allow the user to modify the received BMC configuration information;

store the BMC configuration information in the master BMC configuration database of the master BMC configuration system;

discover the master managed devices in each of the plurality of clusters of managed devices through the discovery module of the master BMC configuration module according to the number and the associated IP addresses of the clusters of managed devices;

configure the BMC of the master managed device of each cluster according to the BMC configuration information of the cluster using the mater BMC configuration module of the master BMC configuration system;

transmit the BMC configuration information for the cluster to each master managed device of each cluster through the plurality of output interfaces of the master BMC configuration system;

install the one slave BMC configuration system on each master managed device of each cluster of managed devices; and instruct each slave BMC configuration module of the slave BMC configuration system on the master managed device of each cluster of managed devices to configure the BMCs on all slave managed devices of the cluster according to the BMC configuration information for the cluster.

21. The method of claim 20, wherein the slave BMC configuration system installed in each master managed device comprises:

a plurality of input interfaces of the slave BMC configuration system configured to communicate with the master BMC configuration system of each master manage device of the cluster over a network and receive BMC configuration information for the slave managed devices of the cluster;

a slave BMC configuration database configured to store the set of BMC configuration information for each slave managed device of the cluster received from the at least one of the plurality of output interfaces of the master BMC configuration system;

a plurality of output interfaces of the slave BMC configuration system configured to communicate with the each salve managed device of the cluster; and the slave BMC configuration module constructed to configure the BMCs installed on each slave managed device of the cluster through the plurality of output interfaces of the slave BMC configuration system.

22. The method of claim 21, wherein the slave BMC configuration module is configured to:

receive the BMC configuration information from at least one of the input interfaces of the slave BMC configuration system;

allow the user to modify the received BMC configuration information;

store the BMC configuration information in the slave BMC configuration database of the slave BMC configuration system;

discover all slave managed devices of the cluster through the discovery module of the slave BMC configuration module according to the number and the associated IP addresses of the slave managed devices of the cluster;

receive instructions from the master BMC configuration system to configure all BMCs of the slave managed devices of the cluster; and configure the BMCs of the slave managed devices of the cluster according to the BMC configuration information for the cluster using the slave BMC configuration module of the slave BMC configuration system.

23. A non-transitory computer storage medium having computer-executable instructions stored thereon which, when executed by a processor of a baseboard management controller (BMC) configuration system, cause the processor to
provide a plurality of input interfaces for receiving BMC configuration information from a user, and import a set of pre-edited files exported from another BMC configuration system that has similar managed devices and configuration;
modify the received BMC configuration information by the user;
store the BMC configuration information in a BMC configuration database;
discover at least one managed device of the BMC configuration system through a discovery module according to a number and associated IP addresses of the at least one managed devices; and
configure each BMC of the at least one managed devices according to the BMC configuration information using a BMC configuration module;
wherein the BMC configuration system is a synchronous BMC configuration system having a master BMC configuration system and a plurality of clusters of managed devices;
wherein each of the plurality of clusters of managed devices has a master managed device, and a plurality of slave managed devices, the master managed device and the plurality of slave managed devices in the same one of the clusters are substantially same type of managed devices, and each has a BMC installed for system management, and each cluster of managed devices has one set of BMC configuration information; and
wherein the master BMC configuration system is configured to transmit the BMC configuration information for each cluster to each master managed device of each cluster and install a slave BMC configuration system on each master managed device of each cluster of managed devices for configuring the plurality of the slave managed devices of each cluster and for allowing a user to communicate with a slave BMC configuration module constructed in each master managed device of each cluster.

24. The non-transitory computer storage medium of claim 23, wherein the BMC configuration information comprises: a number of clusters of managed devices; and BMC configuration information of each of the plurality of clusters of managed devices; and
wherein the BMC configuration database is a master BMC configuration database of the master BMC configuration system, and the BMC configuration module is a master BMC configuration module of the master BMC configuration system.

25. The non-transitory computer storage medium of claim 24, wherein the instructions, when executed by the processor, further cause the processor to
transmit the BMC configuration information for each cluster to each master managed device of the cluster through at least one of the plurality of output interfaces of the master BMC configuration system;
install the slave BMC configuration system on each master managed device of the clusters of managed devices; and
instruct each slave BMC configuration system on the master managed device of each cluster of managed devices to configure the BMCs on all of the slave managed devices of the cluster according to the BMC configuration information for the cluster.

26. The non-transitory computer storage medium of claim 25, wherein the BMC configuration information for the synchronous BMC configuration system comprises:
the number of clusters of managed devices; and
the BMC configuration information of each of the plurality of clusters of managed devices, wherein the BMC configuration of each of the plurality of clusters of managed devices comprises:
type of the managed devices of the cluster;
a name of the manufacturer;
a model number;
a management information base (MIB) file of the managed devices of the cluster;
the number of slave managed devices in the cluster;
the IP addresses of the master manage device and the slave managed devices of the cluster; and
a globally unique identification number of the master managed device and the slave managed devices of the cluster.

27. The non-transitory computer storage medium of claim 23, wherein the BMC configuration system is the slave BMC configuration system of a cluster of managed devices having a master managed device and a plurality of slave managed devices; and
wherein the BMC configuration database is a slave BMC configuration database of a slave BMC configuration system, and the BMC configuration module is a slave BMC configuration module of a master BMC configuration system.

28. The non-transitory computer storage medium of claim 27, wherein the BMC configuration information for the cluster comprises:
type of the managed devices of the cluster;
a name of the manufacturer;
a model number;
a management information base (MIB) file of the managed devices of the cluster;
the number of slave managed devices in the cluster;
the IP addresses of the master manage device and the slave managed devices of the cluster; and
a globally unique identification number of the master managed device and the slave managed devices of the cluster.

* * * * *